United States Patent

[11] 3,572,523

[72] Inventor Hermann K. Cymara
 R.D. #2, Newfield, N.Y. 14867
[21] Appl. No. 840,652
[22] Filed July 10, 1969
[45] Patented Mar. 30, 1971

[54] SILAGE DISTRIBUTOR
 3 Claims, 4 Drawing Figs.
[52] U.S. Cl. .................................... 214/17,
 193/3
[51] Int. Cl. ............................................ B65g 65/32
[50] Field of Search ........................................ 214/17.6,
 17.64; 302/60; 193/3

[56] References Cited
UNITED STATES PATENTS
3,282,591 11/1966 Donelson ..................... 214/17X
3,488,007 1/1970 Neuenschwander ......... 214/17X Primary Examiner—Robert G. Sheridan
Attorney—F. P. Keiper ABSTRACT: Silage distributor adapted for attachment to the silo fill spout discharge end, and which is constructed with deflectors inclined in four directions to provide uniform distribution of the silage discharged into the distributor, and without requiring power.

Patented March 30, 1971 3,572,523

INVENTOR.
HERMANN K. CYMARA.

BY
ATTORNEY

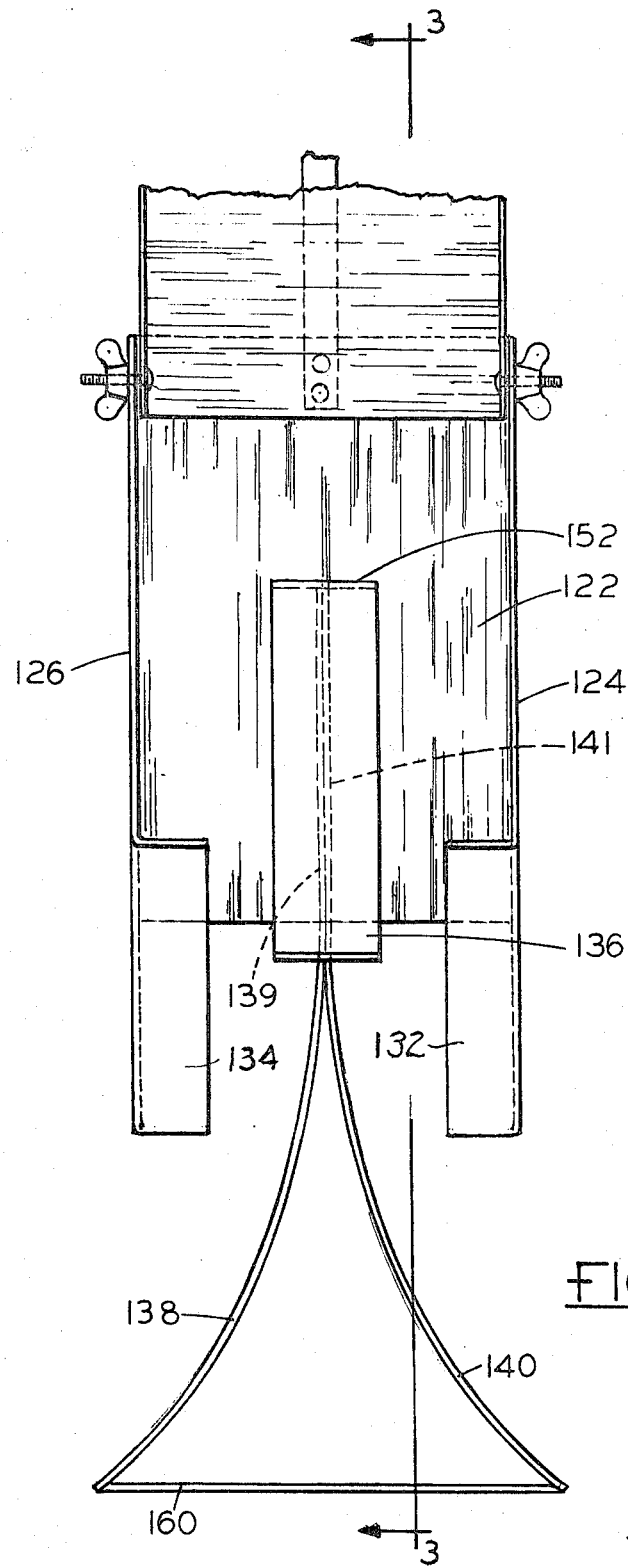

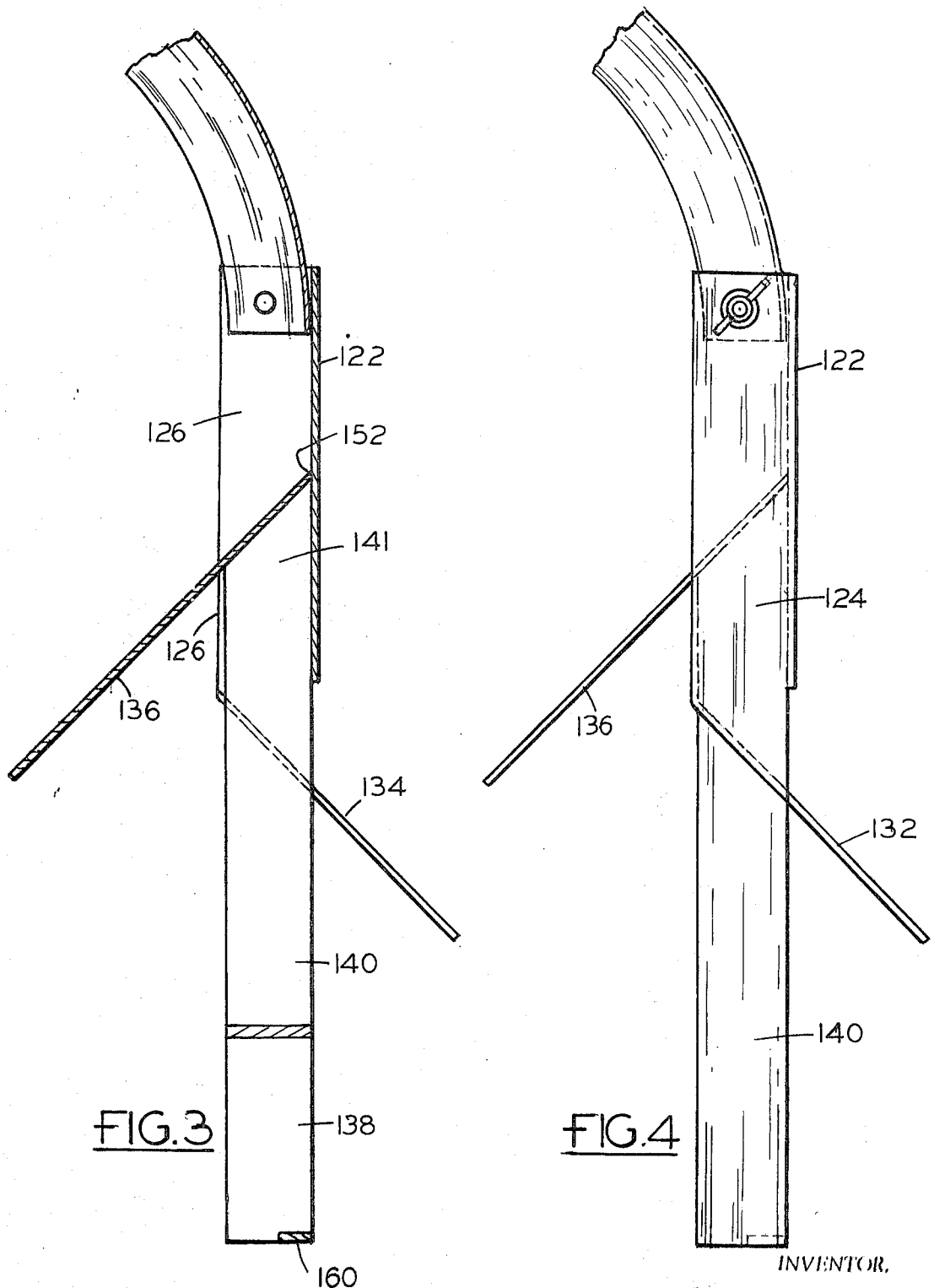

SILAGE DISTRIBUTOR

This invention relates to silo fill spout distributors.

The filling of a silo by a fill spout directing silage into the silo has a tendency to distribute the silage unevenly. As the silo is filled, the uneven distribution prevents the silo from being filled to its maximum, provides uncompacted soft spots providing an uneven loading on the lower layers. Power driven distributors associated with the discharge end of the fill spout have been employed to avoid uneven distribution. Such distributors, one type of which is shown in Cymara U.S. Pat. No. 3,158,408, although effective, require attention, and a source of power near the fill spout at a relatively inconvenient location near the top of the silo.

The present invention is directed to a silo distributor adapted for attachment to the fill spout discharge end, and which is so constructed as to provide uniform distribution of the silage discharged into the distributor, without requiring power.

The above and other novel features of the invention will appear more fully hereinafter from the following detailed description when taken in conjunction with the accompanying drawings. It is expressly understood that the drawings are employed for purposes of illustration only and are not designed as a definition of the limits of the invention, reference being had for this purpose to the appended claims.

In the drawings, wherein like reference characters indicate like parts:

FIG. 2 is a front elevational view of a modification;

FIG. 3 is a sectional view taken on the line 3–3 of FIG. 2, and

FIG. 4 is a side view of the modification.

Figure 1:
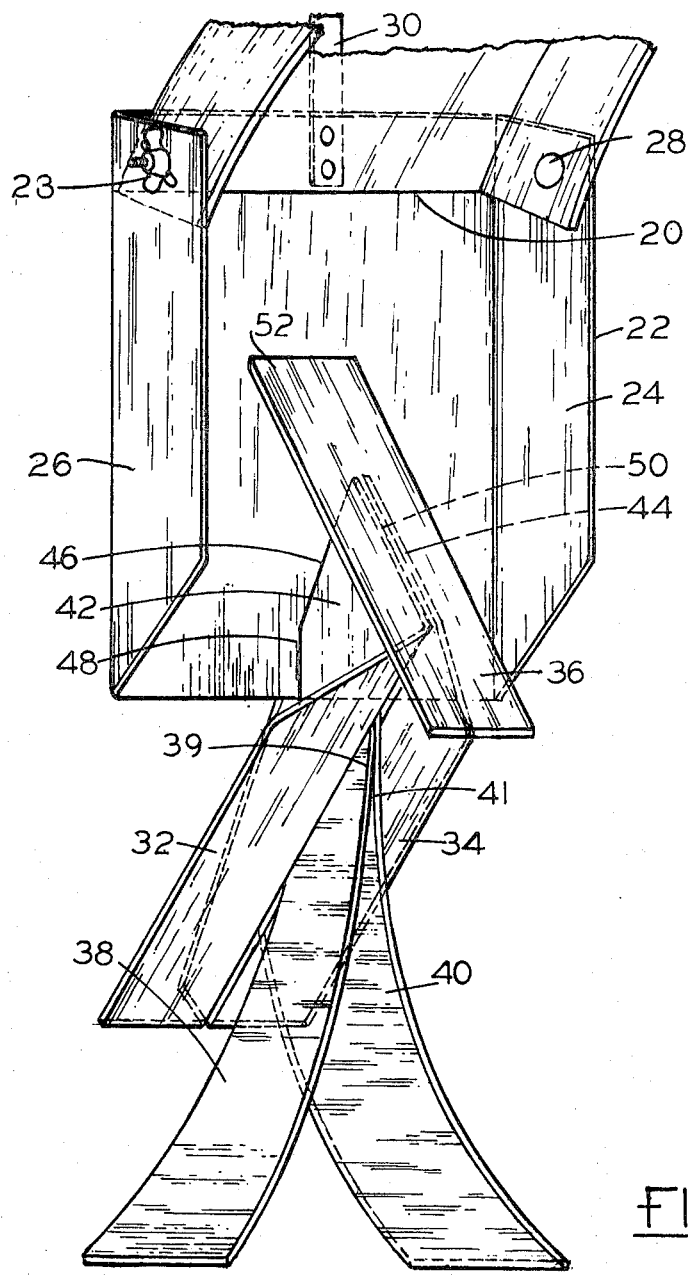
FIG. 1 is a perspective view of the distributor.

Referring to FIG. 1 there is shown the discharge end of a silo fill spout 20 which receives silage from a blower or other apparatus delivering the silage to the spout, as is understood in the art. Attached to the fill spout is a substantially vertical guide chute 22 having side flanges 24 and 26, the flanges being secured to the spout by bolts and thumb nuts 28. An additional support 30 for the chute may be provided to support the same from the silo dome or roof.

In order to provide effective distribution in all directions and including distribution of a portion of the silage in the center, deflectors 32 and 34 are provided for rearward distribution, and curved deflectors 38 and 40 provided for lateral distribution. The upper ends 39 and 41 of the deflectors 38 and 40 are sandwiched between center divider plates 42 and 44, each forming a part of deflector 32 and 34 respectively. The upper rearwardly inclined edge 46 of the plates 42 and 44 extend rearwardly through a center notch 48 in the chute, and the forwardly inclined upper edges 50 provide a support for, and are secure to the underside of a deflector 36, the upper end of which is secured to the backwall of the chute 22 as at 52.

It will be seen that the overall width of the deflectors 32 and 34, and deflector 36, as well as the spread of the lower ends of deflectors 38 and 40 are all less than the width between chute side flanges 24 and 26, so that a considerable portion of silage deflected downwardly in the chute 22 moves along the side flanges 24 and 26 and drops toward the center of the silo, without impinging upon any of the deflectors.

In FIGS. 2, 3 and 4, the chute 122 is provided with lateral deflectors 138 and 140, the upper ends 139 and 141 of which extend to and beneath the forward deflector 136. The upper end of deflector 136 is secured to the chute backwall as at 152. In order to provide rearward distribution, the side flanges 124 and 126 of the chute have integral in bent deflectors 132 and 134, which extend rearwardly of the chute 122.

If desired the lateral deflectors may be provided with a brace 160. As will be seen, silage descending in the chute along the side flanges 124 and 126 will tend to be deflected rearwardly by deflectors 132 and 134, while silage descending centrally of the chute will be deflected forwardly by deflector 136. Silage descending between the deflectors 132 and 134 and deflector 136 will in part be deflected laterally by the deflectors 138 and 140, and in part drop centrally around the deflectors 138 and 140, escaping contact with any of the deflectors. Thus distribution in all directions including the center area is effected.

While two embodiments of the invention have been illustrated and described, it is to be understood that the invention is not limited thereto. As various changes in the construction and arrangement may be made without departing from the spirit of the invention, as will be apparent to those skilled in the art, reference will be had to the appended claims for a definition of the limits of the invention.

I claim:

1. In a silage distributor for use in connection with a silo filling discharge spout, a chute having a backwall and side flanges, means for attaching the side flanges to the discharge end of a silo filling discharge spout with the backwall disposed vertically, a pair of symmetrical deflectors having their upper ends disposed back to back and received to the lower end of the back wall midway between the flanges, and the lower ends diverging laterally away from each other, an inclined deflector mounted above the pair of deflectors, and midway between the side flanges and of a width substantially less than the width of the backwall, and inclined to deflect silage descending downwardly in the chute outwardly and downwardly away from the chute, and deflector means inclined oppositely and disposed below the lower end of the backwall and adapted to deflect silage oppositely to said inclined deflector.

2. A silage distributor according to claim 1 wherein the deflector means is disposed immediately behind the inclined deflector and has an overall width greater than the inclined deflector, but of lesser width than the backwall.

3. A silage distributor according to claim 1 wherein the deflector means comprise separate integral extensions of the side flanges, each extending part way only toward the inclined deflector.